(No Model.)
C. MELDRUM.
BEER BOTTLING APPARATUS.
No. 572,708. Patented Dec. 8, 1896.
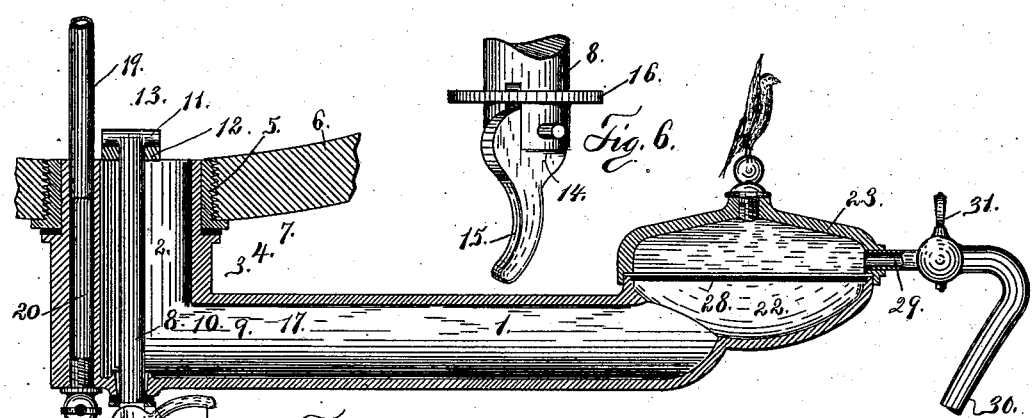
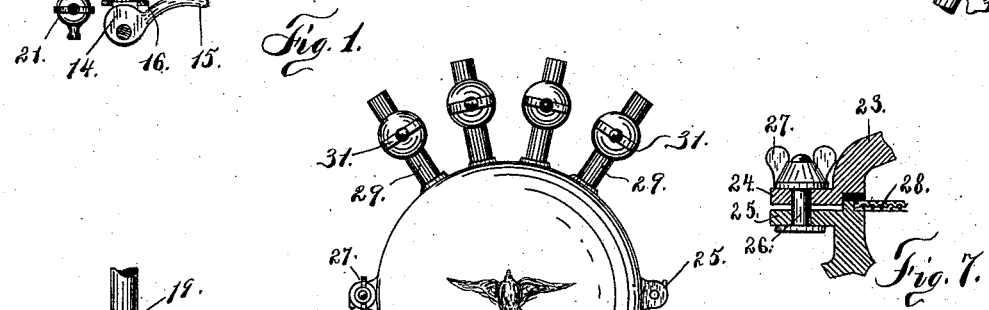
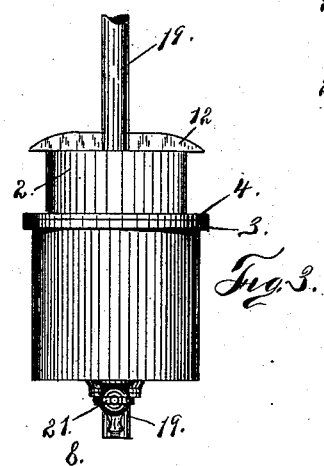
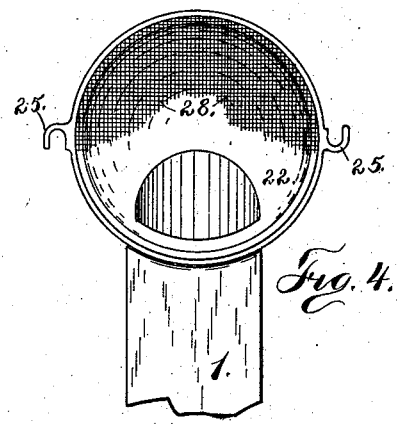
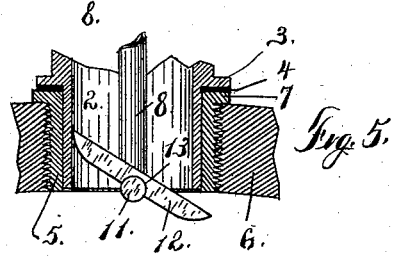
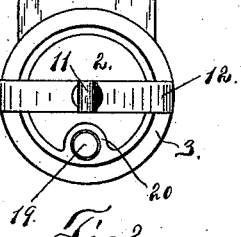
Witnesses
F. P. Austen.
S. J. Thomas.
Inventor
Charles Meldrum
by W. T. Miller
Attorney.
THE NORRIS PETERS CO., PHOTO-LITHO., WASHINGTON, D. C.

UNITED STATES PATENT OFFICE.

CHARLES MELDRUM, OF BUFFALO, NEW YORK, ASSIGNOR OF ONE-HALF TO JACOB P. LORING, OF SAME PLACE.

BEER-BOTTLING APPARATUS.

SPECIFICATION forming part of Letters Patent No. 572,708, dated December 8, 1896.

Application filed July 15, 1895. Serial No. 555,955. (No model.)

*To all whom it may concern:*

Be it known that I, CHARLES MELDRUM, a citizen of the United States, residing at Buffalo, in the county of Erie and State of New York, have invented certain new and useful Improvements in Beer-Bottling Apparatus; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

Prior to my invention it has been the usual custom to fill bottles with beer from the keg by employing flexible rubber tubes which are passed down through the open bung-hole into the beer and siphoning the beer through these tubes into the bottles. The disadvantages in bottling beer in this manner are that too much air is admitted through the open bung-hole and the beer is subjected to unnecessary agitation in being siphoned over, all of which results in the liberation and escape of sufficient gas to materially affect the life of the beer. Then, too, any sediment or impurities which may be present in the beer in the keg are carried over into the bottles, which is also a serious objection.

The object of my present invention is to overcome these defects in a simple and effective manner; and to that end it consists of a passage or conductor one end of which is adapted for tight insertion and removable retention in the bung-hole on the lower side of the keg and provided with a vent-tube which passes up through the beer and into the air-space above, the other end having a chamber across which is placed a strainer and a series of outlet-passages arranged in the wall of the straining-chamber and adapted for engagement with a series of flexible tubes, through which the strained beer passes by gravity into the bottles.

In the drawings, Figure 1 is a central vertical longitudinal section of my improved apparatus shown applied to the under side of a keg. Fig. 2 is a top plan view of the apparatus detached. Fig. 3 is an end view of the attachable end of the apparatus. Fig. 4 is a detail top plan view of the straining-chamber with the cover removed. Fig. 5 is a sectional view of a portion of the attachable end, illustrating the manner of securing the same to the keg. Fig. 6 is a detached detail perspective view of the cam for securing the apparatus in the bung-hole, and Fig. 7 is a central vertical section of the device for securing the cover upon the straining-chamber.

Referring to the drawings, 1 is the passage or conductor, of metal, which is provided at one end with the cylindrical inlet-orifice 2 at right angles thereto. Surrounding the outside wall of this orifice is the annular shoulder 3, adapted for the reception of the rubber gasket or washer 4. That portion of the inlet-orifice 2 above the shoulder 3 is adapted for insertion in the bung-hole 5 of the beer-keg 6, (see Fig. 1,) where it is to be tightly held, the compression of the washer 4, which is interposed between the shoulder 3 and the rim 7 of the bung-hole, serving to form a tight joint to prevent the leakage of beer. By means of the shoulder 3 the inlet-orifice 2 may be made to fit different-sized bung-holes within the range of the width of the shoulder.

The means which I employ to temporarily secure the inlet-orifice in the bung-hole consists of the rod 8, which passes up loosely through the socket 9. This socket is made slightly flaring toward its upper end, as at 10, to permit the upper end of the rod 8 to be moved to one side. The upper end of this rod is provided with a T-shaped head 11, upon which is loosely pivoted the locking cross-piece 12, having the central transverse depression 13, in which the T-shaped head 11 rests. In the lower bifurcated the end of rod 8 is pivoted the cam 14, provided with lever-handle 15. The cam 14 is operated against the metallic ring 16, (see Fig. 6,) loosely surrounding the rod 8, which presses it against a rubber washer 17, between it and the socket 9, to make a tight joint. The same pressure pulls down the rod 8, causing the locking cross-piece to rest tightly at its ends against the edge of the bung-hole 5, its body standing across the same.

19 is a vent-tube. (Shown in Fig. 1 as partly broken away at its center.) This tube is adjustably and removably secured in a socket 20 in one side of the inlet-orifice 2 in any suitable manner, as by screw-threads, as shown in this view, its lower projecting end having the stop-cock 21. This vent-tube extends up inside the keg to the air-space above the beer.

At the outer end of the passage or conductor 1 and communicating therewith is the chamber 22, provided with the removable cover 23, which is provided on each side with an apertured lug 24. The lower half of the chamber 22 has on each side of its upper edge the horizontal hooks 25, extending in opposite directions.

Through each apertured lug 24 is loosely pressed a bolt 26, the upper end of which is in engagement with a thumb-nut 27. The shanks of these bolts are adapted for engagement with the hooks 25, and the thumb-nuts 27 are employed to clamp those hooks 25 to the apertured lugs 24 and thereby hold the cover 23 securely in place. To remove the cover, loosen the thumb-nuts 27 and the shanks of the bolts 26 can be moved out of the hooks, thus releasing the cover. Arranged centrally across this chamber is the strainer 28, which can be lifted out when the cover 23 is removed, as its edges are clamped between the cover and the wall of the chamber 22, preferably with rubber packing interposed, as shown.

At the farther side of the cover are arranged a series of outlet passages or tubes 29, (herein shown as four in number,) to the outer ends of which are attached lengths of flexible rubber tubing 30. Each outlet-tube is provided with a stop-cock 31.

My improved apparatus is secured in position and operates as follows: The keg containing the beer is laid lengthwise with the open bung-hole in the upper side. (See Fig. 5.) The locking cross-piece is turned in its bearing so as to enter the inlet-orifice 2 in an inclined position, and when it reaches the bottom on turning the rod slightly to one side it permits the cross-piece 12 to clear the orifice and assume a horizontal position. Then on throwing up the cam 14 the outer ends of the cross-piece come into engagement with the inside wall of the keg on opposite sides of the bung-hole, which serves to secure the apparatus to the keg, which is then reversed in position, so that the apparatus is underneath, as shown in Fig. 1. The vent-tube 19 is passed up in its socket 20 until its upper end is above the beer in the keg, and its stop-cock 21 is then opened, permitting an upward passage of air through the same. The apparatus is then ready for operation, the beer passing down by gravity into the passage 1, up through the strainer 28 in the chamber 22, and out through the exit-tubes 29 and flexible rubber tubes 30 into the bottles. The beer is thus subjected to much less agitation than in the well-known siphoning process, and all impurities in the form of sediment are kept from passing into the bottles.

The apparatus can be quickly and securely attached and as quickly removed, and can be readily and thoroughly cleaned when necessary, the cover 23 of the straining-chamber and the strainer being easily removed for that purpose.

I claim—

1. In an apparatus for bottling beer, the combination with the tubular conductor having valved outlets at one end and a cylindrical inlet-orifice at its other end standing at right angles to its body and provided with an annular shoulder, and a vent-tube adjustable through such orifice, the conductor having a socket in its lower side opposite the end of the inlet-orifice; of a rod passing loosely through said socket and through the orifice, a cross-piece centrally pivoted to its upper end, a rubber washer surrounding its lower end beneath said socket, a metallic ring also surrounding it just above said washer, and a cam pivoted in the lower end of the rod, all as and for the purpose set forth.

2. In an apparatus for bottling beer, the combination with the tubular conductor having valved outlets at one end and a cylindrical inlet-orifice at its other end standing at right angles to its body and provided with an annular shoulder, and a vent-tube adjustable through such orifice, the conductor having an upwardly-flaring socket in its lower side opposite the end of the inlet-orifice; of a rod passing loosely through said socket and through the orifice, a cross-piece centrally pivoted to its upper end, and clamping means on its lower protruding end outside the conductor, as and for the purpose set forth.

3. In an apparatus for bottling beer, the combination with the tubular conductor having valved outlets at one end and a cylindrical inlet-orifice at its other end standing at right angles to its body and provided with an annular shoulder, the conductor having an upwardly-flaring socket in its lower side opposite the end of the inlet-orifice; of a rod passing loosely through said socket and through the orifice and having a T-head at its upper end, a cross-piece having a central depression in which the T-head rests, and clamping means on its lower protruding end outside the conductor, as and for the purpose set forth.

4. In an apparatus for bottling beer, the combination with an L-shaped conductor whose upright arm is adapted to enter the bung in the bottom of the barrel, an annular flange around it, a rubber washer resting on the flange, and means for removably clamping such washer and flange tightly against the barrel around its hole; of a chamber at the outer end of the other arm of the conductor, oppositely-opening hooks on the sides thereof, a cover having a number of valved outlet-tubes and provided with apertured lugs, and bolts in the latter adapted to be tightened in said hooks, as and for the purpose set forth.

In testimony whereof I have signed my name to this specification in the presence of two subscribing witnesses.

CHARLES MELDRUM.

Witnesses:
JACOB P. LORING,
W. T. MILLER.